Dec. 31, 1940. C. M. YOUNG, JR 2,226,989
CONVEYER CHAIN STRUCTURE FOR CONTINUOUS FLOW CONVEYERS OR THE LIKE
Filed Jan. 30, 1940
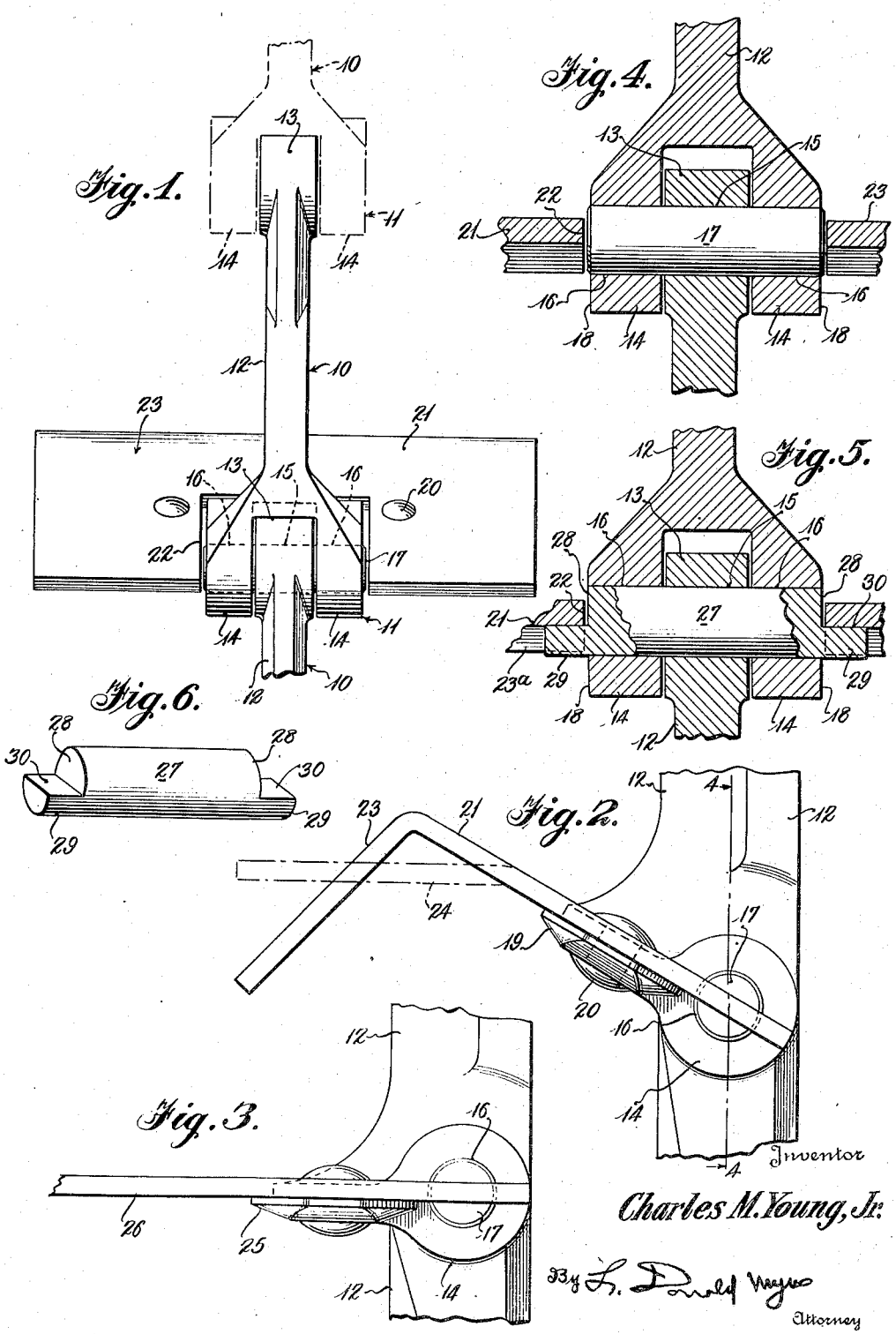
Inventor
Charles M. Young, Jr.
Attorney Patented Dec. 31, 1940

2,226,989

UNITED STATES PATENT OFFICE 2,226,989

CONVEYER CHAIN STRUCTURE FOR CONTINUOUS FLOW CONVEYERS OR THE LIKE

Charles M. Young, Jr., Philadelphia, Pa., assignor to Link-Belt Company, a corporation of Illinois Application January 30, 1940, Serial No. 316,412

9 Claims. (Cl. 198—176)

This invention relates to new and useful improvements in conveyer chains for continuous flow conveyers, elevators, or elevator-conveyers and deals more specifically with the joint structure employed for interconnecting adjacent links.

It is the present practice to retain chain pins in place in the pitch holes of conveyer chains by such devices as cotters, headed pin ends, and/or peened-over or riveted pin ends. All of such devices have a serious retarding effect when the conveyer chains are employed for moving comminuted materials in a continuous flow or mass through the closed casings or conduits of horizontal conveyers, elevators, and conveyer-elevators. In practically all such installations, the comminuted materials are moved past or around the chain links in feeding the materials into or discharging the same from the material moving spaces between adjacent chain flights. Any projection or obstruction carried by or formed on the chain parts retard this movement of material and in many instances will result in carrying material over from the active run to the return or inactive run of the conveyer. This naturally lowers the capacity of the machine.

It is the primary object of this invention to provide novel conveyer chain articulated joint structure in which the chain pins are retained in place in the pitch holes of interconnected links without resorting to the use of any devices which will have a retarding effect on materials which are moved past or around the chain links in being fed to or discharged from the material transporting spaces between adjacent flights of conveyers, elevators, or conveyer-elevators designed to provide a continuous flow of divided solid materials.

A further object of this invention is to provide novel chain pin retaining means for conveyer chains. Other objects and advantages of the invention will be apparent during the course of the following description.

In the accompanying drawing forming a part of this specification and in which like numerals are employed to designate like parts throughout the same, Figure 1 is an elevational view of a section of a conveyer chain embodying this invention, Figure 2 is an enlarged, elevational view taken at right angles to Fig. 1, Figure 3 is a view similar to Fig. 2 but illustrates a slightly modified form of chain structure, Figure 4 is a longitudinal sectional view taken on line 4—4 of Fig. 2, Figure 5 is a view similar to Fig. 4 but illustrates a modified form of chain pin structure, and Figure 6 is a detail, perspective view of the chain pin structure disclosed in Fig. 5.

In the drawing, wherein for the purpose of illustration are shown the preferred embodiments of this invention, and particularly referring to Figs. 1, 2, and 4, the reference character 10 designates each one of a series of bar links which are adapted to be interconnected by articulated joints 11 to form an endless chain structure.

Fig. 1 discloses one complete link as including a main body portion 12 having a single joint ear 13 centrally formed on one end thereof and a pair of symmetrically arranged, relatively spaced joint ears 14 formed on its remaining end. The space between the ears 14 is of sufficient dimensions to receive the centrally positioned joint ear 13 of an adjacent link 10. These joint ears 13 and 14 are provided with pitch holes 15 and 16, respectively, which are axially aligned with each other when the joint ears 13 and 14 are properly arranged in overlapped relation.

When these pitch holes 15 and 16 are properly aligned, they are adapted to receive a chain pin 17, see Fig. 4. This chain pin 17 may have a loose or running fit with respect to the several pitch holes 15 and 16 or the pin may have a press fit with either the pitch hole 15 or the pitch hole 16. However, in view of structural features to be described at a later joint, it is preferred to have the chain pin loosely fitted in all pitch holes so that it will, in effect, float therein. By inspecting Figs. 1 and 4, it will be seen that the opposite ends of the chain pin 17 are cut off square and the overall length of the pin is substantially the same as the width of both joint ears 14. These relative dimensions of the chain pin 17 and the joint ears 14 cause the opposite end faces of the chain pin to substantially coincide with the flat end faces 18 of the joint ears 14.

Fig. 2 discloses an attachment lug 19 as being formed integrally with the end of the link body having the pair of joint ears 14. This attachment lug 19 is adapted to have secured thereto, as by means of rivets, bolts, or the like, 20 a material moving flight 21. Fig. 1 discloses this flight 21 as being cut away or notched at 22 to receive the pair of joint ears 14 when the flight is properly attached to the lug 19. Figs. 1, 2, and 4 clearly disclose this flight 21 as being arranged so that its inner portions, the spaced parts formed by the notch 22, overlie the opposite ends of the chain pin 17. These spaced portions of the flight 21, therefore, will function to retain the chain pin in place in the pitch holes 15 and 16. It is impossible for this chain pin to work loose or come out of these pitch holes as long as the flight 21 is properly secured to the attachment lug 19.

During the normal operation of a conveyer chain having flights 21 attached thereto, the surface or face 23 of each flight will constitute the material moving face. It will be appreciated, therefore, that material can be discharged from this face 23 past or around the chain link without being retarded in any way by the chain pin 17 or any securing projection carried thereby or attached thereto. Of course, the rear faces of flights 21 are just as unobstructed by the chain pins as the front faces and will discharge or shed material just as readily. When it is desired to disassemble or break any joint in the chain, it merely becomes necessary to remove the flight 21 at the joint and the chain pin 17 then may be withdrawn from its pitch holes 15 and 16.

Fig. 2 discloses in dot and dash lines a slightly modified form of conveyer flight 24. This flight is identical in construction with the flight 21 with the exception of the portion which projects laterally from the attachment lug 19. This laterally projection portion extends at right angles to the length of the chain link body 12 instead of being angularly shaped like the flight 21.

Fig. 3 discloses a flight structure and chain joint which differs from the disclosures of Figs. 1, 2, and 4 only by having an attachment lug 25 which is properly shaped for having secured thereto a flat flight 26. As all of the remaining elements of this structure are identical with elements of the structure disclosed in Figs. 1, 2, and 4, the same reference characters will be applied thereto.

Figs. 5 and 6 disclose a modified form of chain pin which may be employed in any of the chain joint structures disclosed in Figs. 1 to 4, inclusive, in place of the chain pin 17. This modified chain pin 27 includes a main body portion which terminates in flat end faces 28 and eccentric extensions 29 which are provided with flat side faces 30 arranged at right angles to the flat end faces 28.

These flat end faces 28 are spaced from each other a distance which substantially corresponds with the overall width of the pair of joint ears 14 so that these flat faces substantially register with or lie in the planes of the side faces 18 of these ears. The extensions 29, however, extend or project beyond these side faces 18 of the ears 14.

By inspecting Fig. 5, it will be seen that when the flight 21 is attached to its chain link so that the notched or cut away portion 22 will straddle the joint ears 14, the inner edges of this notch or cut away portion 22 will engage the end faces 28 of the chain pin 27. The back surface 23a of the flight 21 will engage the side faces 30 of the lug extensions 29. This interfitting relationship between the spaced flight portions and the surfaces 28 and 30 of the chain pin 27 will function to prevent the pin from partaking of axial movement relative to its pitch holes 15 and 16 and will prevent the chain pin from partaking of angular movement with respect to the joint ears 14. The joint ear 13 and the chain pin 27, however, may partake of relative angular movement to provide the articulated joint for the interconnected chain links. It will be appreciated that the chain pin extensions 29 overlie the back or non-material moving surface 23a of the flight 21 and will in no way interfere with movement of material off of the active surface 23 of this flight. Even when it is required to move material over or shed material from the back of the flights, the chain pin extensions 29 present curved or non-retarding surfaces and will not interfere with such movement.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. In a conveyer chain, a pair of links having overlapping joint ears provided with aligned pitch holes, a laterally projecting flight attachment lug formed integrally with the ear formation of one of said links, a chain pin positioned in the aligned pitch holes of said ears and having end faces which substantially coincide with the extreme outer side faces of said overlapping joint ears, and a flight secured to the attachment lug, said flight being notched at its inner edge portion to permit the flight, when secured to the attachment lug, to be positioned so as to straddle the overlapped ears and extend across the outer ends of the aligned pitch holes.

2. In a conveyer chain, a pair of links having overlapping joint ears provided with aligned pitch holes, a flight attachment lug carried by one of the links adjacent said overlapping ears, a chain pin positioned in the aligned pitch holes of said ears and having end faces which substantially coincide with the extreme outer side faces of said overlapping joint ears, and a flight secured to the attachment lug and having means overlying the end faces of said chain pin for preventing removal of the pin from said pitch holes as long as the flight is secured to the attachment lug.

3. In a conveyer chain, a pair of links having overlapping joint ears provided with aligned pitch holes, a flight attachment lug carried by one of the links adjacent said overlapping ears, a chain pin positioned in the aligned pitch holes of said ears and having end faces which substantially coincide with the extreme outer side faces of said overlapping joint ears, and a flight secured to the attachment lug and having a notch formed therein to permit the flight to straddle the overlapping joint ear assembly so as to overlie the end faces of said chain pin for presenting removal of the pin from said pitch holes as long as the flight is secured to the attachment lug.

4. In a conveyer chain, a pair of links having overlapping joint ears provided with aligned pitch holes, a flight attachment lug carried by one of the links adjacent said overlapping ears, a chain pin positioned in the aligned pitch holes of said ears and having its ends cut off square to substantially coincide with the extreme outer side faces of said overlapping joint ears, and a flight secured to the attachment lug and having means overlying the squared end faces of said chain pin for retaining the pin in place in said pitch holes.

5. In a conveyer chain, a pair of links having overlapping joint ears provided with aligned pitch holes, a flight attachment lug carried by one of the links adjacent said overlapping ears, a chain pin positioned in the aligned pitch holes of said ears and having its ends cut off square to substantially coincide with the extreme outer side faces of said overlapping joint ears, and a flight secured to the attachment lug and having a notch formed therein to permit the flight to straddle the overlapping joint ear assembly so as to overlie the squared end faces of said chain pin for retaining the pin in place in the pitch holes.

6. In a conveyer chain, a pair of links having overlapping joint ears provided with aligned pitch holes, a flight attachment lug carried by one of the links adjacent said overlapping ears, a chain pin positioned in the aligned pitch holes of said ears, a flight secured to the attachment lug, and means associated with the chain pin and the flight for holding the chain pin in said pitch holes against axial and angular movements.

7. In a conveyer chain, a pair of links having overlapping joint ears provided with aligned pitch holes, a flight attachment lug carried by one of the links adjacent said overlapping ears, a chain pin positioned in the aligned pitch holes of said ears, said chain pin having end faces which substantially coincide with the extreme outer side faces of said overlapping joint ears and an extension projecting axially of each of said end faces, and a flight secured to the attachment lug and having means for engaging the end faces and the axial extensions of said chain pin for holding the chain pin in said pitch holes against both axial and angular movements.

8. In a conveyer chain, a pair of links having overlapping joint ears provided with aligned pitch holes, a flight attachment lug carried by one of the links adjacent said overlapping ears, a chain pin positioned in the aligned pitch holes of said ears, said chain pin having end faces which substantially coincide with the extreme outer side faces of said overlapping joint ears and an extension projecting axially of each of said end faces, and a flight secured to the attachment lug and having a notch formed therein to permit the flight to straddle the overlapping joint ear assembly so as to overlie the end faces of said chain pin and engage the sides of the axial extensions of said pin for holding the pin in said pitch holes against both axial and angular movements.

9. In a conveyer chain, a pair of links having overlapping joint ears provided with aligned pitch holes, a laterally projecting flight attachment lug carried by one of the links adjacent said overlapping ears, a chain pin positioned in the aligned pitch holes of said ears and having end faces which substantially coincide with the extreme outer side faces of said overlapping joint ears, a flight secured to the attachment lug, said flight being notched at its inner edge portion to permit the flight, when secured to the attachment lug, to be positioned so as to straddle the overlapped ears and extend across the outer ends of the aligned pitch holes, and means carried by the chain pin for holding the pin against relative rotation with respect to one of the links.

CHARLES M. YOUNG, Jr.